US010240561B2

(12) United States Patent
    Zsurka

(10) Patent No.: US 10,240,561 B2
(45) Date of Patent: Mar. 26, 2019

(54) AERODYNAMIC TRACK FAIRING FOR A GAS TURBINE ENGINE FAN NACELLE

(71) Applicant: United Technologies Corporation, Hartford, CT (US)

(72) Inventor: Mark Zsurka, Utica, NY (US)

(73) Assignee: United Technologies Corporation, Farmington, CT (US)

( * ) Notice: Subject to any disclaimer, the term of this patent is extended or adjusted under 35 U.S.C. 154(b) by 556 days.

(21) Appl. No.: 14/776,062

(22) PCT Filed: Mar. 13, 2014

(86) PCT No.: PCT/US2014/026223
§ 371 (c)(1),
(2) Date: Sep. 14, 2015

(87) PCT Pub. No.: WO2014/151673
PCT Pub. Date: Sep. 25, 2014

(65) Prior Publication Data
US 2016/0040627 A1    Feb. 11, 2016

Related U.S. Application Data

(60) Provisional application No. 61/792,865, filed on Mar. 15, 2013.

(51) Int. Cl.
*B64D 33/04* (2006.01)
*F02K 1/78* (2006.01)
(Continued)

(52) U.S. Cl.
CPC ............... *F02K 1/70* (2013.01); *B64D 29/00* (2013.01); *B64D 29/02* (2013.01); *B64D 29/06* (2013.01);
(Continued)

(58) Field of Classification Search
CPC ..... F02K 1/09; F02K 1/52; F02K 1/72; F02K 1/78; F02K 3/06; B64D 29/06; B64D 33/04; F05D 2220/36
See application file for complete search history.

(56) References Cited

U.S. PATENT DOCUMENTS 3,161,018 A    12/1964  Sandre
3,779,010 A    12/1973  Charnay et al.
(Continued)

FOREIGN PATENT DOCUMENTS

EP    0567277    10/1993
FR    1503425    11/1967
GB    2189550    10/1987

OTHER PUBLICATIONS

EP search report for EP14769134.9 dated Oct. 24, 2016.

*Primary Examiner* — Todd E Manahan
*Assistant Examiner* — Rene Ford
(74) *Attorney, Agent, or Firm* — O'Shea Getz P.C.

(57) ABSTRACT

A gas turbine engine includes an aerodynamic track fairing adjacent to a convergent-divergent nozzle, the aerodynamic track fairing including a localized curvature along an outside edge. The aerodynamic track fairing is configured to offset a circumferential pressure gradient otherwise introduced in part by a transition between the convergent-divergent nozzle with the aerodynamic track fairing.

12 Claims, 5 Drawing Sheets

(51) Int. Cl.
  *F02K 1/70* (2006.01)
  *F01D 5/14* (2006.01)
  *F01D 9/02* (2006.01)
  *F01D 25/24* (2006.01)
  *B64D 29/00* (2006.01)
  *B64D 29/02* (2006.01)
  *B64D 29/06* (2006.01)

(52) U.S. Cl.
  CPC ............ *B64D 33/04* (2013.01); *F01D 5/141* (2013.01); *F01D 5/143* (2013.01); *F01D 9/02* (2013.01); *F01D 25/24* (2013.01); *F02K 1/78* (2013.01); *F05D 2220/323* (2013.01); *F05D 2240/10* (2013.01); *F05D 2240/11* (2013.01); *F05D 2240/14* (2013.01); *F05D 2250/712* (2013.01); *F05D 2260/602* (2013.01); *Y02T 50/673* (2013.01)

(56) References Cited

U.S. PATENT DOCUMENTS

| | | | |
|---|---|---|---|
| 3,820,719 A | 6/1974 | Clark | |
| 3,879,941 A | 4/1975 | Sargisson | |
| 3,931,708 A | 1/1976 | Motycka | |
| 4,043,121 A | 8/1977 | Thomas et al. | |
| 4,068,471 A | 1/1978 | Simmons | |
| 4,085,583 A | 4/1978 | Klees | |
| 4,175,384 A | 11/1979 | Wagenknecht et al. | |
| 4,327,548 A | 5/1982 | Woodward | |
| 4,409,788 A | 10/1983 | Nash et al. | |
| 4,466,587 A | 8/1984 | Dusa et al. | |
| 5,261,227 A | 11/1993 | Giffin, III | |
| 5,388,964 A | 2/1995 | Ciokajlo et al. | |
| 5,402,638 A | 4/1995 | Johnson | |
| 5,404,713 A | 4/1995 | Johnson | |
| 5,524,847 A | 6/1996 | Brodell et al. | |
| 5,577,381 A | 11/1996 | Eigenbrode et al. | |
| 5,586,431 A | 12/1996 | Thonebe et al. | |
| 5,593,112 A | 1/1997 | Maier et al. | |
| 5,646,716 A | 7/1997 | Nagashima | |
| 5,653,406 A * | 8/1997 | Amano | B64C 7/02 244/130 |
| 5,655,360 A | 8/1997 | Butler | |
| 5,755,092 A * | 5/1998 | Dessale | B64D 33/04 60/262 |
| 5,778,659 A | 7/1998 | Duesler et al. | |
| 5,794,432 A | 8/1998 | Dunbar et al. | |
| 5,806,302 A | 9/1998 | Cariola et al. | |
| 5,806,303 A | 9/1998 | Johnson | |
| 5,809,772 A | 9/1998 | Giffin, III et al. | |
| 5,833,140 A | 11/1998 | Loffredo et al. | |
| 5,853,147 A | 12/1998 | Standish et al. | |
| 5,867,980 A | 2/1999 | Bartos | |
| 5,887,822 A * | 3/1999 | Thornock | B64D 33/04 244/53 R |
| 5,988,980 A | 11/1999 | Busbey et al. | |
| 6,292,763 B1 | 9/2001 | Dunbar et al. | |
| 6,318,070 B1 | 11/2001 | Rey et al. | |
| 6,373,802 B1 | 4/2002 | Hattori et al. | |
| 6,658,839 B2 * | 12/2003 | Hebert | B64D 33/06 181/213 |
| 6,729,575 B2 | 5/2004 | Bevilaqua | |
| 6,735,936 B2 | 5/2004 | Rey et al. | |
| 6,901,739 B2 | 6/2005 | Christopherson | |
| 7,004,047 B2 | 2/2006 | Rey et al. | |
| 7,174,704 B2 | 2/2007 | Renggli | |
| 2006/0101807 A1 | 5/2006 | Wood et al. | |
| 2009/0320488 A1 | 12/2009 | Gilson et al. | |
| 2010/0050651 A1* | 3/2010 | Dindar | B64D 33/04 60/770 |
| 2010/0229527 A1 | 9/2010 | Amkraut et al. | |
| 2011/0120080 A1* | 5/2011 | Schwark, Jr. | F02K 1/09 60/226.3 |
| 2011/0120081 A1* | 5/2011 | Schwark, Jr. | F02K 1/09 60/226.3 |
| 2011/0277448 A1* | 11/2011 | Roberts | B64D 29/06 60/226.2 |
| 2011/0290935 A1 | 12/2011 | Machado et al. | |
| 2011/0296813 A1* | 12/2011 | Frank | F02K 1/09 60/230 |
| 2011/0318173 A1* | 12/2011 | Ramlaoui | B64D 29/06 415/182.1 |
| 2012/0211599 A1 | 8/2012 | Morvant et al. | |

\* cited by examiner

US 10,240,561 B2

AERODYNAMIC TRACK FAIRING FOR A GAS TURBINE ENGINE FAN NACELLE

This application claims priority to PCT Patent Appln. No. PCT/US14/26223 filed Mar. 13, 2014, which claims priority to U.S. Patent Appln. No. 61/792,865 filed Mar. 15, 2013.

BACKGROUND

The present disclosure relates to a gas turbine engine, and more particularly to an aerodynamic track fairing that includes a localized curvature.

Gas turbine engines, such as those which power commercial and military aircraft, include a compressor to pressurize a supply of air, a combustor to burn a hydrocarbon fuel in the presence of the pressurized air, and a turbine to extract energy from the resultant combustion gases.

An aerodynamic fan nacelle at least partially surrounds an aerodynamic core nacelle such that an annular bypass flowpath is defined between the core nacelle and the fan nacelle. The fan bypass airflow provides a majority of propulsion thrust, the remainder provided from combustion gases discharged through the core exhaust nozzle. The aerodynamic fan nacelle may, however, be subject to thrust-penalizing flow components at adjacent interfaces such as the interface between the fan nacelle and an engine pylon.

SUMMARY

A gas turbine engine according to one disclosed non-limiting embodiment of the present disclosure includes a convergent-divergent nozzle and an aerodynamic track fairing adjacent to the convergent-divergent nozzle, the aerodynamic track fairing defining a compound edge including an aft portion that extends toward an aft end of the aerodynamic track fairing to define a primary curvature and a forward portion between the convergent-divergent nozzle and the aft portion defining a substantially reverse curvature relative to the primary curvature thereby minimizing a pressure gradients between the convergent-divergent nozzle and the aerodynamic track fairing.

In a further embodiment of the present disclosure, the aerodynamic track fairing is adjacent to an engine pylon.

In a further embodiment of any of the foregoing embodiments of the present disclosure, the reverse curvature extends toward the engine pylon.

In a further embodiment of any of the foregoing embodiments of the present disclosure, the aerodynamic track fairing is adjacent to a Bi-Fi splitter.

In a further embodiment of any of the foregoing embodiments of the present disclosure, the reverse curvature extends toward the Bi-Fi splitter.

A further embodiment of any of the foregoing embodiments of the present disclosure includes a thrust reverser system upstream of the aerodynamic track fairing.

In a further embodiment of any of the foregoing embodiments of the present disclosure, the reverse curvature decreases a magnitude of the circumferential pressure gradient to reduce the non-axial component of flow adjacent to the fan nozzle exit plane.

In a further embodiment of any of the foregoing embodiments of the present disclosure, the reverse curvature initiates at a trailing edge of a fan nacelle.

In a further embodiment of any of the foregoing embodiments of the present disclosure, the reverse curvature initiates at a trailing edge of a fan nacelle adjacent the convergent-divergent nozzle.

In a further embodiment of any of the foregoing embodiments of the present disclosure, the primary curvature is convex and the reverse curvature is concave.

A method of defining an outer aerodynamic surface profile of an aerodynamic track fairing according to another disclosed non-limiting embodiment of the present disclosure includes offsetting a circumferential pressure gradient otherwise introduced in part by a rapid transition between a convergent-divergent nozzle and an aerodynamic track fairing with a substantially reverse curvature relative to a primary curvature that extends toward an aft end of the aerodynamic track fairing A further embodiment of any of the foregoing embodiments of the present disclosure includes locating the aerodynamic track fairing adjacent to an engine pylon.

A further embodiment of any of the foregoing embodiments of the present disclosure includes locating the aerodynamic track fairing adjacent to a Bi-Fi splitter.

In a further embodiment of any of the foregoing embodiments of the present disclosure, the convergent-divergent nozzle is located within a fan nacelle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
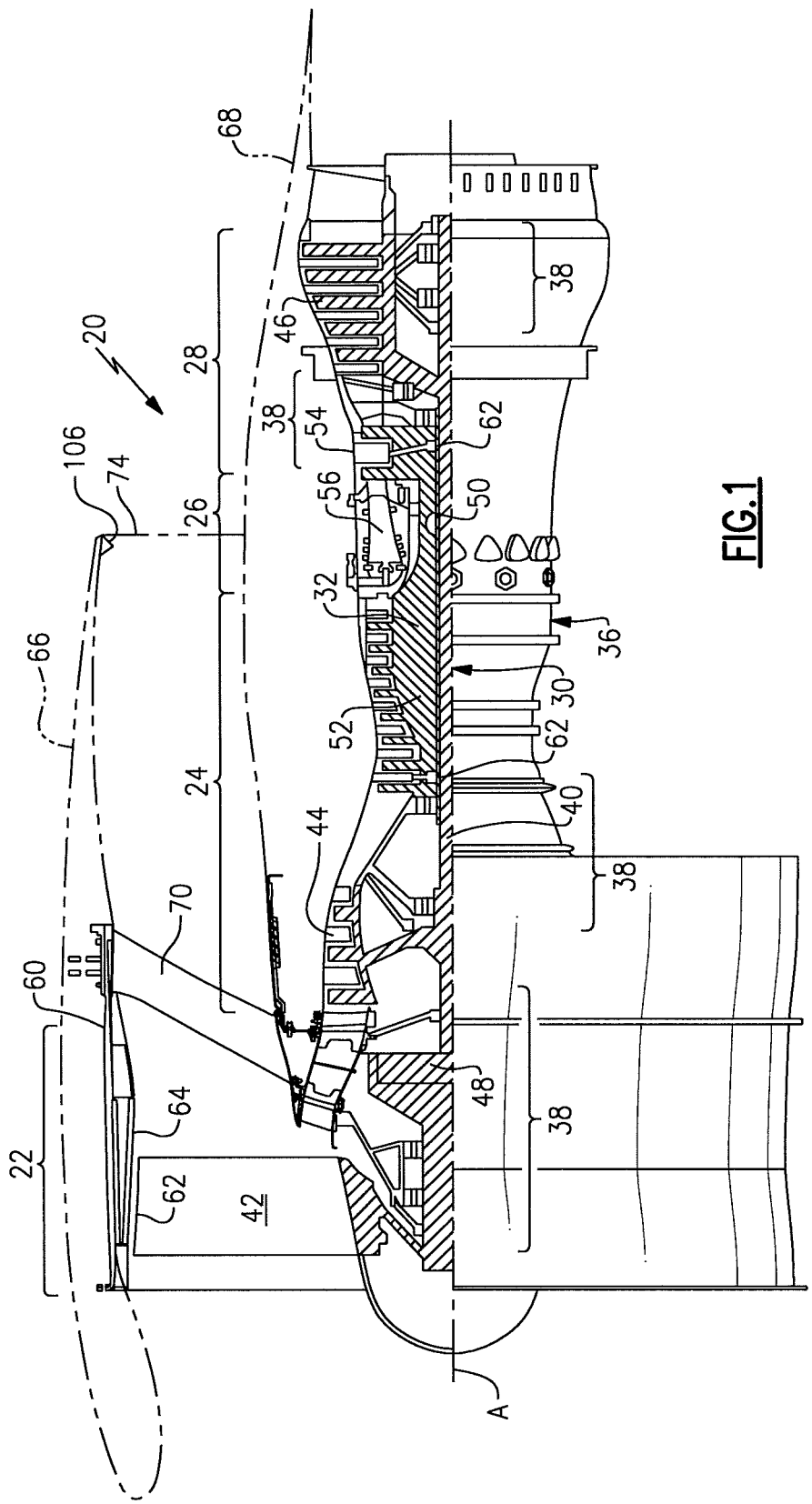
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures might include an augmentor section and exhaust duct section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan blades 42, a low pressure compressor ("LPC") 44 and a low pressure turbine ("LPT") 46. The inner shaft 40 drives the fan blades 42 directly or through a geared architecture 48 to drive the fan blades 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing compartments 38. It should be understood that various bearing compartments 38 at various locations may alternatively or additionally be provided.

In one example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the LPC 44 and LPT 46 to render increased pressure in a relatively few number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans, where the rotational speed of the fan 42 is the same (1:1) of the LPC 44.

In one example, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The relatively low Fan Pressure Ratio according to one example gas turbine engine 20 is less than 1.45. Low Corrected Fan Tip Speed is the actual fan tip speed divided by an industry standard temperature correction of ("Tram"/ 518.7)$^{0.5}$. The Low Corrected Fan Tip Speed according to one example gas turbine engine 20 is less than about 1150 fps (351 m/s).

The fan section 22 generally includes a fan containment case 60 within which the fan blades 42 are contained. Tips 62 of the fan blades 42 run in close proximity to an inboard surface 64 of the fan containment case 60. The fan containment case 60 is enclosed within an aerodynamic fan nacelle 66 (illustrated schematically) that at least partially surrounds an aerodynamic core nacelle 68 (illustrated schematically). The fan containment case 60 and aerodynamic fan nacelle 66 are supported by circumferentially spaced structures 70 often referred to as Fan Exit Guide Vanes (FEGVs).

The bypass flowpath is defined between the core nacelle 68 and the fan nacelle 66. The engine 20 generates a high bypass flow arrangement with a bypass ratio in which approximately eighty percent of the airflow which enters the fan nacelle 66 becomes bypass airflow through the bypass flowpath. The bypass flow communicates through the generally annular bypass flow path and is discharged through a nozzle exit area 74.

Figure 2:
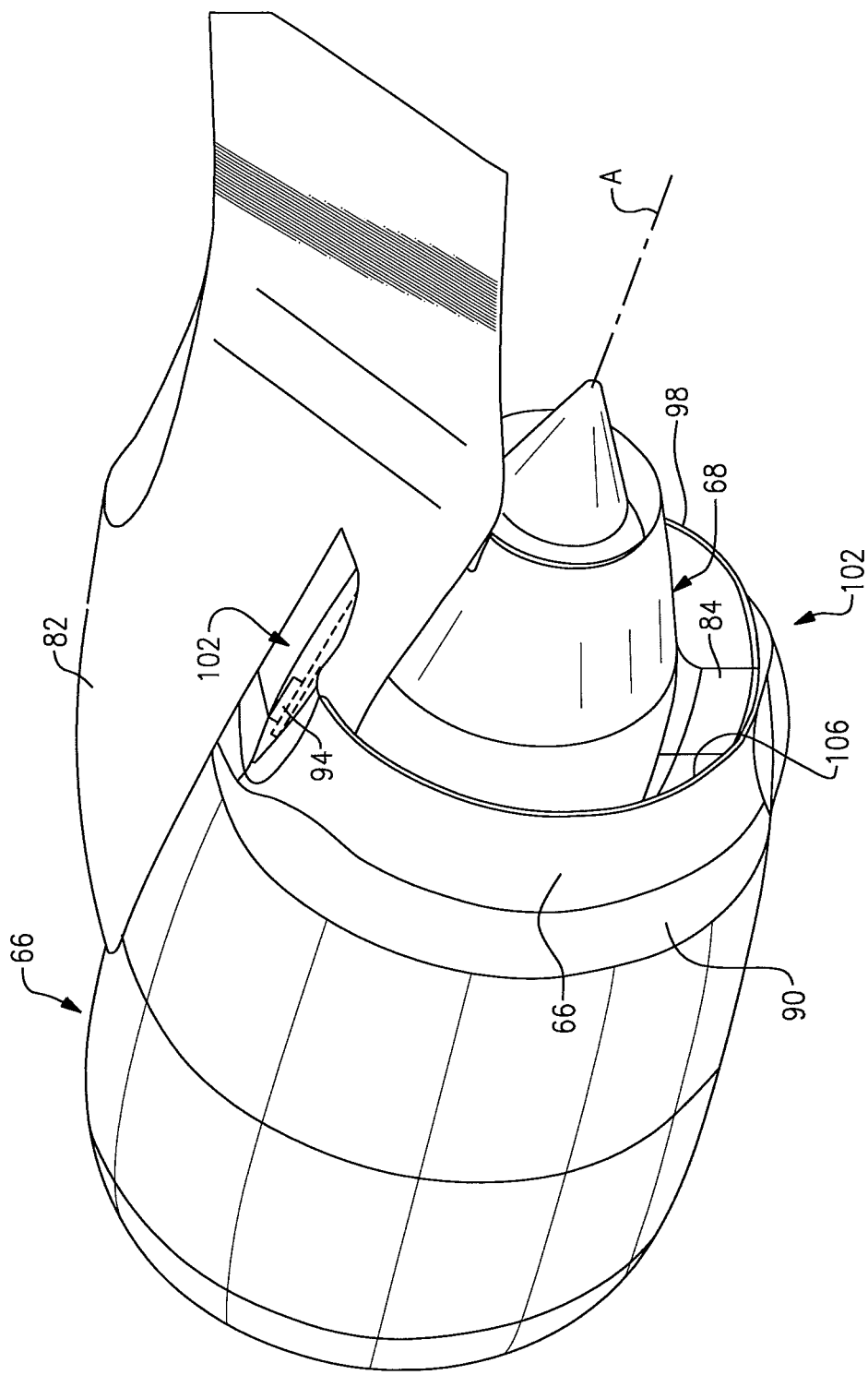
FIG. 2 is a perspective view of the gas turbine engine.

With reference to FIG. 2, the fan nacelle 66 interfaces with an engine pylon 82 and a Bi-Fi splitter 84. The engine pylon 82 is adapted to mount the engine 20 to an aircraft airframe such as, for example, an aircraft fuselage, an aircraft wing, etc. The Bi-Fi splitter 84 extends radially to interconnect the fan nacelle 66 and the core nacelle 68 to provide communication there between for oil lines, conduits, wire harnesses, etc.

The fan nacelle 66 may also contain a thrust reverser system 90 (illustrated schematically). Each fan nacelle 66 axially slides fore and aft along respective track assemblies 92 (illustrated schematically) generally located adjacent the engine pylon 82 and the Bi-Fi splitter 84. One or more actuators 94 (illustrated schematically) provide the motive force to operate the thrust reverser system 90. Each of the track assemblies 92 are at least partially surrounded by an aerodynamic track fairing 102 which are often referred to as a 'beaver tail'.

The aerodynamic track fairing 102 at least partially defines an outer aerodynamic surface profile of the fan nacelle 66 to at least partially accommodate the thrust reverser system 90. That is, the aerodynamic track fairing 102 at least partially encloses each of the track assemblies 92 and/or the actuator 94. Alternatively, or in addition the aerodynamic track fairing 102 may be located on a lower surface of the fan nacelle 66 adjacent to the Bi-Fi splitter 84. That is, the aerodynamic track fairing 102 extends beyond the trailing edge 98 of the fan nacelle 66.

Figure 3:
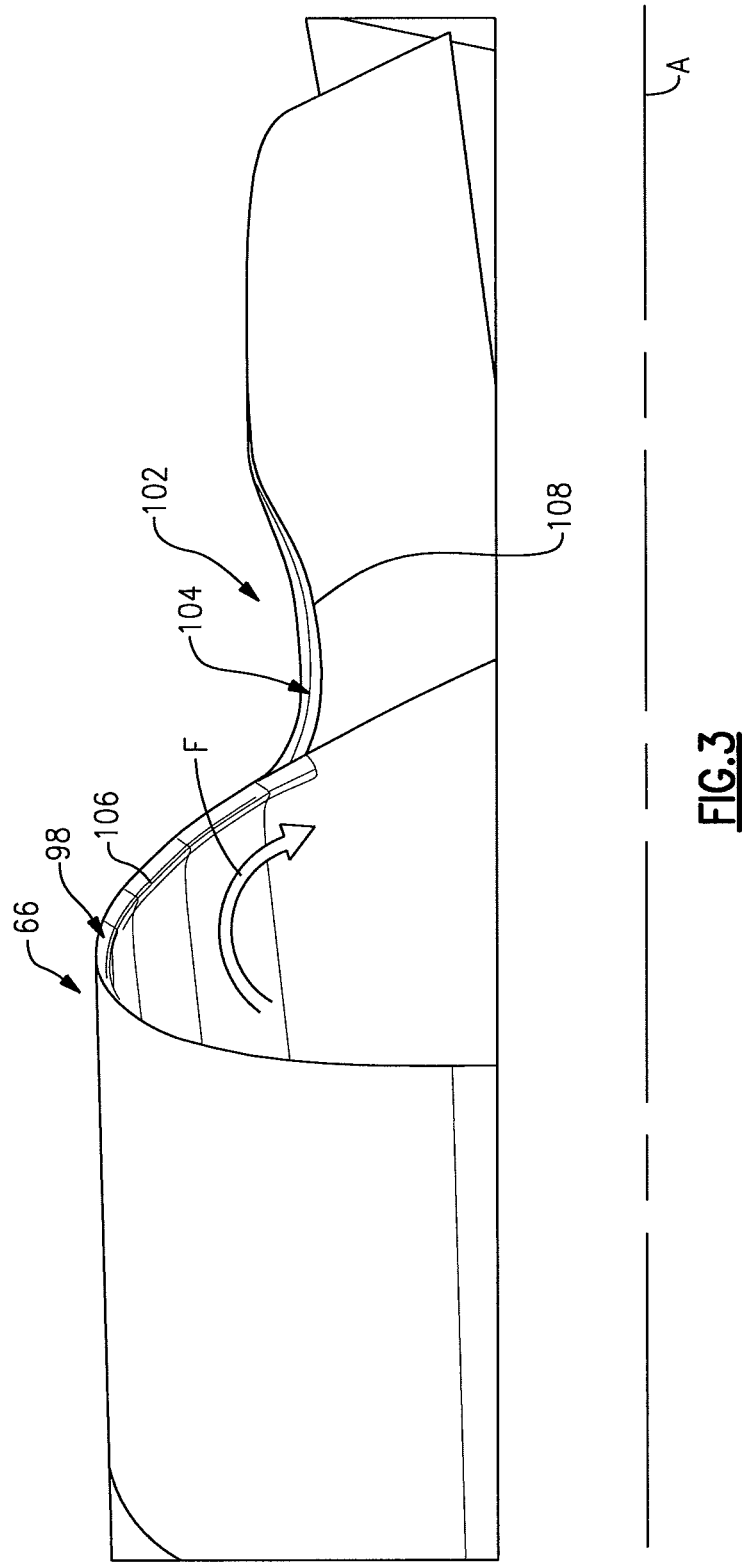
FIG. 3 is a perspective view from an inner surface of an aerodynamic track fairing that includes a localized curvature.

The sharp transition between a convergent-divergent nozzle 106 within the inner geometry of the fan nacelle 66 with an outboard edge 110 of the aerodynamic track fairing 102 may, however, induce a thrust-penalizing, flow component (arrow F; FIG. 3) due to a local drop in static pressure introduced by a convergent-divergent nozzle 106 within the inner geometry of the fan nacelle 66.

The convergent-divergent nozzle 106 is essentially a "ski-jump" adjacent the trailing edge 98 along the inner surface of the fan nacelle 66. To facilitate packaging of the thrust reverser system 90, as well as to not effect hingebeam (not shown) shape, the convergent-divergent nozzle 106 may be geometrically constrained to exclude the aerodynamic track fairing 102 (best seen in FIG. 3). That is, the inner surface 108 of the aerodynamic track fairing 102 is essentially flat and does not include the "ski-jump" profile. A "hingebeam" as defined herein is the beam from which the thrust reverser system 90 is mounted and upon which the track assemblies 92. The hingebeam is the structure underneath the aerodynamic track fairing 102 on which the thrust reverser doors swing. It is preferred; however, to not change the aerodynamic track fairing 102 near the hingebeam, yet still mitigate adverse performance effects of a convergent-divergent nozzle 106.

To offset this circumferential flow component (arrow F; FIG. 3), the aerodynamic track fairing 102 includes a localized curvature 104 (FIGS. 3-5) to offset the circumferential pressure gradient introduced by the transition from the convergent-divergent nozzle 106 to the inner surface 108 of the aerodynamic track fairing 102.

With reference to FIG. 3, the convergent-divergent nozzle 106 is defined within an inner surface of the fan nacelle 66 but stops at an inner surface 108 of the aerodynamic track fairing 102 such that a relatively rapid transition from the convergent-divergent nozzle 106 "ski-jump" shape to the relatively flat inner surface 108 of the aerodynamic track fairing 102 is formed. The relatively rapid transition may cause the locally strong pressure gradient (arrow F) in the theta direction, e.g., in the vicinity of the circumferential aerodynamic track fairing 102. This may tend to introduce a velocity component that is not parallel to the engine central longitudinal axis A. Consequently, the axial thrust of the fan bypass airflow may be decreased.

The localized curvature 104 (FIGS. 4 and 5) decreases the magnitude of the circumferential pressure gradient to reduce the circumferential flow component (arrow F) and thereby essentially increase the axial thrust component. That is, the localized curvature 104 reduces the pressure on the outside edge 110 of the aerodynamic track fairing 102 so that the relatively low pressure region adjacent the convergent divergent nozzle 106 is, in a relative sense, not as low compared to the pressure on the inner surface 108 of the aerodynamic track fairing 102. In other words, the convergent-divergent nozzle 106 generates a suction for fan bypass airflow from the inner surface 108 of this aerodynamic track fairing 102 and the localized curvature 104 on the outside edge 110 of the aerodynamic track fairing 102 mitigates this suction.

Figure 4:
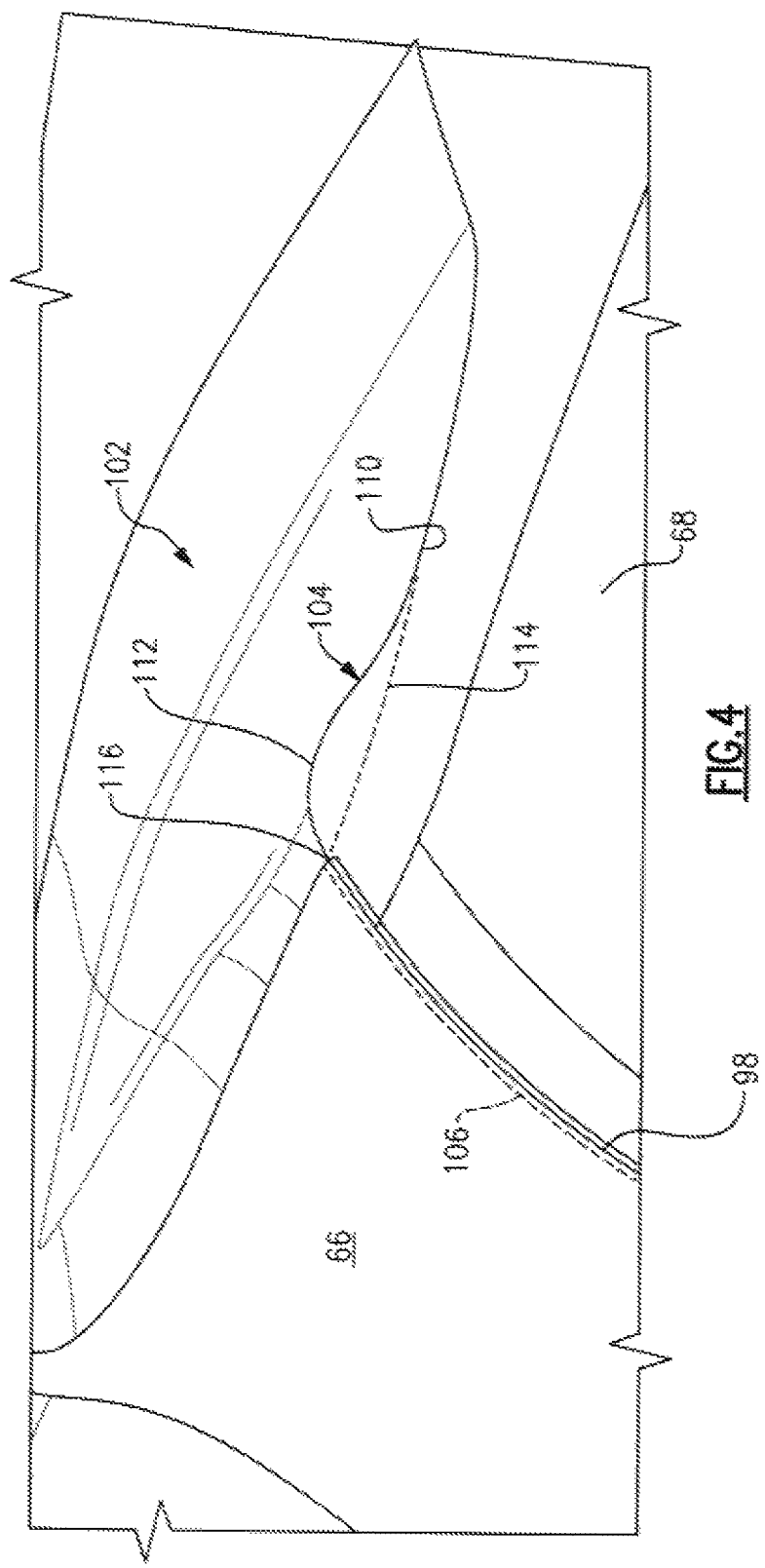
FIG. 4 is a outer rear perspective view of the localized curvature looking forward.
Figure 5:
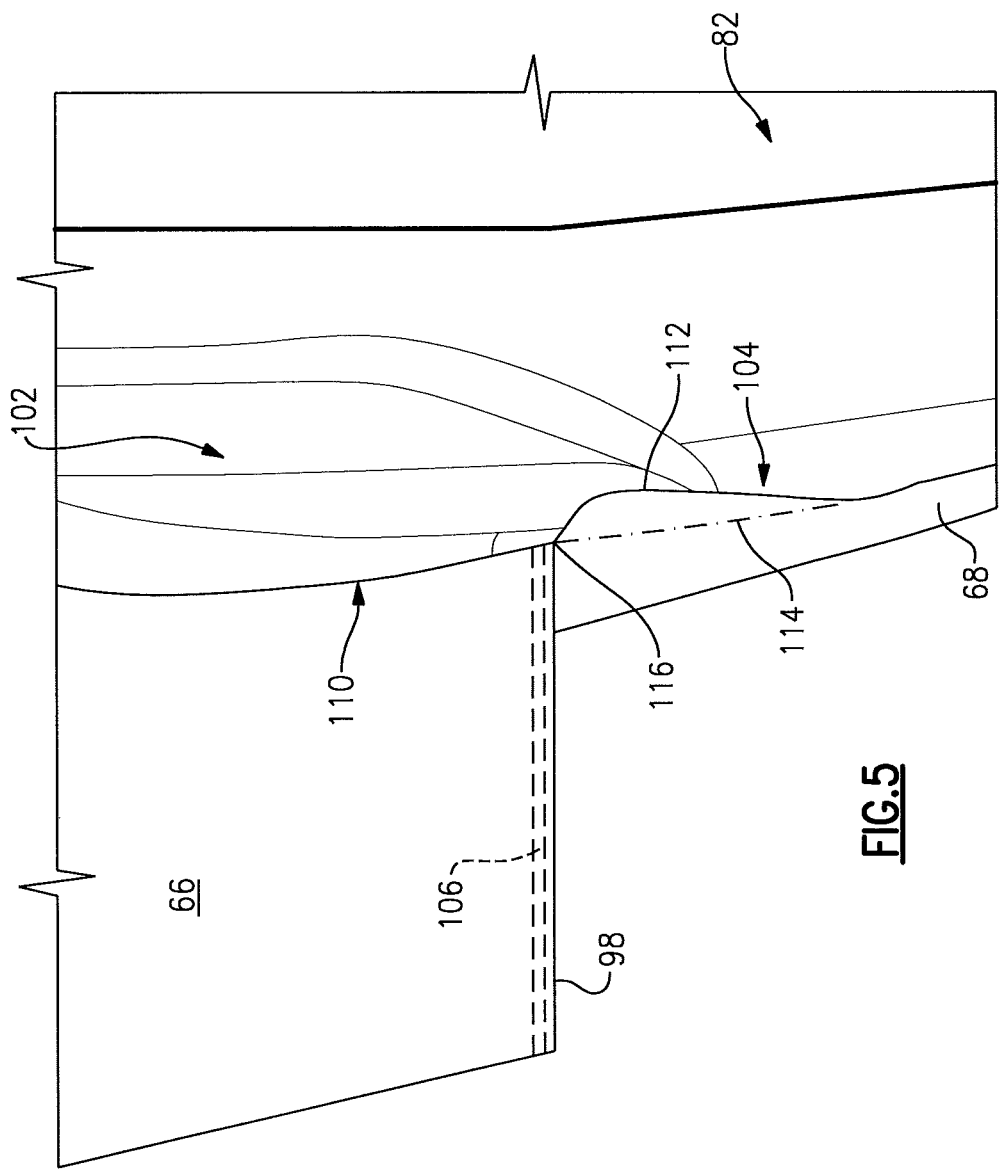
FIG. 5 is a top perspective view of the localized curvature looking downward.

With reference to FIG. 4, the localized curvature 104 in one disclosed non-limiting embodiment includes a reverse curvature 112 that is generally opposite that of a primary curvature 114 of the aerodynamic track fairing 102 outside edge 110. In one disclosed non-limiting embodiment, the primary curvature 114 defines an airfoil-shaped curvature that generally curves away from the engine pylon 82 and/or the Bi-Fi splitter 84.

The reverse curvature 112 initiates at the trailing edge 98 of the fan nacelle 66 at point 116, curves inward toward the pylon 82 and/or Bi-Fi splitter 84 then rejoins and blends into the primary curvature 114. That is, the reverse curvature 112 is an airfoil-shaped curvature opposite that of the primary curvature 114. It should be appreciated that the primary curvature 114 may alternatively be of various shapes and need not be a constant single curvature.

The localized curvature 104 need not necessarily be a geometric criterion but is defined to overcome the low pressure region adjacent to the convergent-divergent nozzle 106. Generally, the 'steeper' the convergent-divergent nozzle 106, the greater the required localized curvature 104. The extent of the required localized curvature 104 may further be related to an area ratio the convergent-divergent nozzle 106. For small area ratios, like those encountered in many commercial engine configurations, the localized curvature 104 may be relatively subtle The majority of the aerodynamic track fairing 102 need not change other than the localized curvature 104 which advantageously avoids changes to the actuators 94. That is, the localized curvature 104 is relatively small such that packaging issues are minimized. Furthermore, as the localized curvature 104 is on the outside edge 110 of the aerodynamic track fairing 102, the localized curvature 104 does not affect fan nacelle 66 structural interfaces such as hinge structures.

The localized curvature 104 beneficially maintains axial bypass airflow to increase fan bypass airflow efficiency through minimization of velocity components that do not contribute to axial engine thrust.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A gas turbine engine comprising:
   a convergent-divergent nozzle including an outlet having a trailing edge; and
   an aerodynamic track fairing adjacent to said convergent-divergent nozzle, said aerodynamic track fairing defining a compound edge extending aft from the trailing edge, the aerodynamic fairing including an aft portion that extends toward an aft end of said aerodynamic track fairing to define a primary curvature and a forward portion extending between the trailing edge and said aft portion, the forward portion of the compound edge defining a substantially reverse curvature relative to said primary curvature thereby minimizing a pressure gradient between said convergent-divergent nozzle and said aerodynamic track fairing;

wherein a width of the aerodynamic fairing at the forward portion is less than a width of the aerodynamic track fairing at the aft portion.

2. The gas turbine engine as recited in claim 1, wherein said aerodynamic track fairing is adjacent to an engine pylon.

3. The gas turbine engine as recited in claim 2, wherein said aft portion defining said reverse curvature extends toward said engine pylon.

4. The gas turbine engine as recited in claim 1, wherein said aerodynamic track fairing is adjacent to a Bi-Fi splitter.

5. The gas turbine engine as recited in claim 4, wherein said aft portion defining said reverse curvature extends toward said Bi-Fi splitter.

6. The gas turbine engine as recited in claim 1, further comprising a thrust reverser system upstream of said aerodynamic track fairing.

7. The gas turbine engine as recited in claim 1, wherein said reverse curvature decreases a magnitude of said circumferential pressure gradient to reduce said non-axial component of flow adjacent to said fan nozzle exit plane.

8. The gas turbine engine as recited in claim 1, wherein said reverse curvature initiates at the trailing edge of a fan nacelle.

9. The gas turbine engine as recited in claim 1, wherein said reverse curvature initiates at the trailing edge of a fan nacelle adjacent said convergent-divergent nozzle.

10. The gas turbine engine as recited in claim 1, wherein said primary curvature is convex and said reverse curvature is concave.

11. The gas turbine engine of claim 1, wherein
the convergent-divergent nozzle comprises a convergent portion and a divergent portion;
the convergent portion extends radially inward as the convergent portion extends axially, in a downstream direction, to the divergent portion; and
the divergent portion extends radially outward as the divergent portion extends axially, in the downstream direction, away from the convergent portion.

12. The gas turbine engine of claim 1, wherein the convergent-divergent nozzle comprises a convergent-divergent surface that forms an outer peripheral boundary portion of a bypass flowpath.

* * * * *